(12) United States Patent
Huang et al.

(10) Patent No.: US 9,264,843 B2
(45) Date of Patent: Feb. 16, 2016

(54) SIMPLE COMMUNICATION SYSTEM AND METHOD THEREOF

(71) Applicants: Nen-Fu Huang, Hsinchu (TW); Wei-Kuan Shih, Hsinchu (TW)

(72) Inventors: Nen-Fu Huang, Hsinchu (TW); Wei-Kuan Shih, Hsinchu (TW)

( * ) Notice: Subject to any disclaimer, the term of this patent is extended or adjusted under 35 U.S.C. 154(b) by 0 days.

(21) Appl. No.: 14/296,152

(22) Filed: Jun. 4, 2014

(65) Prior Publication Data

US 2014/0364086 A1    Dec. 11, 2014

(30) Foreign Application Priority Data

Jun. 5, 2013  (TW) ............................. 102119868 A

(51) Int. Cl.
*H04W 72/00* (2009.01)
*H04W 4/00* (2009.01)
*H04W 76/02* (2009.01)

(52) U.S. Cl.
CPC ............ *H04W 4/001* (2013.01); *H04W 76/023* (2013.01); *H04W 76/02* (2013.01)

(58) Field of Classification Search
CPC ..... H04W 12/00; H04W 12/02; H04W 12/04; H04W 12/06; H04W 12/08; H04W 4/00; H04W 4/001; H04W 4/003; H04W 76/023; H04W 76/02; H04W 76/027
USPC ............ 455/410, 411, 450, 451, 452.1, 452.2
See application file for complete search history.

(56) References Cited

U.S. PATENT DOCUMENTS

| | | | |
|---|---|---|---|
| 8,768,309 B2 * | 7/2014 | Robbins et al. | 455/412.2 |
| 8,938,690 B1 * | 1/2015 | Khouri et al. | 715/808 |
| 2008/0207190 A1 * | 8/2008 | Altberg et al. | 455/422.1 |
| 2009/0016507 A1 * | 1/2009 | Altberg et al. | 379/114.01 |
| 2009/0199114 A1 * | 8/2009 | Lewis et al. | 715/763 |
| 2009/0285143 A1 * | 11/2009 | Kwun et al. | 370/311 |
| 2010/0324961 A1 * | 12/2010 | Singh et al. | 705/8 |
| 2011/0009097 A1 * | 1/2011 | Sweeney et al. | 455/414.1 |
| 2012/0095810 A1 * | 4/2012 | Miao et al. | 705/12 |
| 2014/0342707 A1 * | 11/2014 | Rincon et al. | 455/414.1 |

* cited by examiner

*Primary Examiner* — Jean Gelin
(74) *Attorney, Agent, or Firm* — Wang Law Firm, Inc.

(57) ABSTRACT

A simple communication system and a method thereof. The system is used to establish a call from the second user to the first user, and includes an object creation module, object downloading module, and channel establishing module. The object creation module generates communication application module according to notice path for the second user. The object downloading module informs the second user to download and install the communication application module, so a click-to-call icon is generated on a communication terminal of the second user. The channel establishing module establishes a communication channel between the second user and the first user. When the click-to-call icon is trigged by the second user, the channel establishing module establishes the communication channel. The channel establishing module is not allowed to accept the request of the first user to establish the communication channel.

8 Claims, 4 Drawing Sheets

SIMPLE COMMUNICATION SYSTEM AND METHOD THEREOF

CROSS-REFERENCE TO RELATED APPLICATION

This application claims the benefit of Taiwan Patent Application No. 102119868, filed on Jun. 5, 2013, in the Taiwan Intellectual Property Office, the disclosure of which is incorporated herein in its entirety by reference.

BACKGROUND OF THE INVENTION

1. Field of the Invention

The present disclosure relates to a communication system and a method thereof, in particular, to a communication system and a method thereof which only can establish a communication channel for a specific user.

2. Description of the Related Art

At present, many network communication services are provided by companies, so that the users can contact with each other via the network communication. However, before using the service, the users who desire to talk with each other must register in the network communication platform firstly, and the users must maintain the login status in the network communication platform for communicating with each other. In other words, if one of the users does not register the network communication platform, or not login to the network communication platform, they cannot use this free network communication service to talk with each other. In addition, too much information is provided on the internet in this generation, so personal privacy protection becomes very important. The user often leaves telephone number or network communication account to others for further communication. However, it may be easy to search such information in the internet, if the telephone number or network communication account of the user is searched on the internet and the searched information is used to harass the user by persons with malice, the user must change his or her telephone number or network communication account. It is inconvenient for the user.

Therefore, what is need is a communication system capable of establishing communication between many persons quickly at any time, and protecting personal privacy efficiently.

SUMMARY OF THE INVENTION

To solve the above-mentioned problems, one of objectives of the present disclosure is to provide a simple communication system which only can establish communication channel by a specific user for communicating with many persons at any time, so as to protect personal privacy efficiently.

An aspect of the exemplary embodiments of the present disclosure is to provide a simple communication system which is adapted for communicating between the second user and the first user. The simple communication system comprises an object creation module, an object downloading module and a channel establishing module. The object creation module is configured for generating a communication application module according to a notice path for the second user provided by the first user. The object downloading module informs the second user to download and install the communication application module, so that a click-to-call icon can be generated on a communication terminal of the second user. The channel establishing module is configured for establishing a communication channel between the second user and the first user. When the click-to-call icon on the communication terminal is trigged by the second user, the channel establishing module establishes the communication channel according to a request from the second user. The channel establishing module is not allowed to accept the request from the first user to establish the communication channel.

Preferably, the communication channel comprises a network communication channel or a telecommunication channel, and the channel establishing module establishes the network communication channel according to an instant communication module or a web communication module, and when the network communication channel cannot be established, the channel establishing module establishes the telecommunication channel to connect the second user and the first user.

Preferably, the object downloading module further installs the instant communication module in the communication terminal after installing the communication application module in the communication terminal of the second user.

Preferably, the content of the communication application module is encrypted information, and the second user cannot obtain any information related to the first user from the communication application module.

Preferably, the first user can set a communication setting condition for the communication application module installed in the communication terminal of the second user, and the communication setting condition comprises a time limitation of the communication, a type of communication approach, a telephone number of the first user, free telecommunication authority, the invalidation time of the communication application module, or the image to be shown on the click-to-call icon.

Another aspect of the exemplary embodiments of the present disclosure is to provide a simple communication method for communicating between a second user and a first user. The simple communication method comprises the steps of: providing a cloud server which comprises a channel establishing module, an object creation module and an object downloading module; using the object creation module to generate the communication application module according to a notice path when the first user connects the cloud server and provides a notice path for the second user; using the object downloading module to inform the second user to download and install the communication application module in a communication terminal of the second user, whereby a click-to-call icon can be generated on a communication terminal; when the click-to-call icon on the communication terminal is trigged, the channel establishing module establishes the communication channel according to a request from the second user. The channel establishing module is not allowed to accept the request from the first user to establish the communication channel.

Preferably, the communication channel comprises a network communication channel or a telecommunication channel, and the channel establishing module establishes the network communication channel according to an instant communication module or a web communication module, and when the network communication channel cannot be established, the channel establishing module establishes the telecommunication channel to connect the second user and the first user.

Preferably, the simple communication method of the present disclosure further comprises a step of installing the instant communication module in the communication terminal after the communication application module is installed in the communication terminal of the second user.

Preferably, the content of the communication application module is encrypted information and any information related to the first user cannot be obtained from the communication application module.

Preferably, the simple communication method of the present disclosure further comprises a step of providing the first user to set a communication setting condition for the communication application module installed in the communication terminal of the second user, the communication setting condition comprising a time limitation of the communication, a type of the communication approach, telephone number of the first user, free telecommunication authority, the invalidation time of the communication application module, or the image to be shown on the click-to-call icon.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
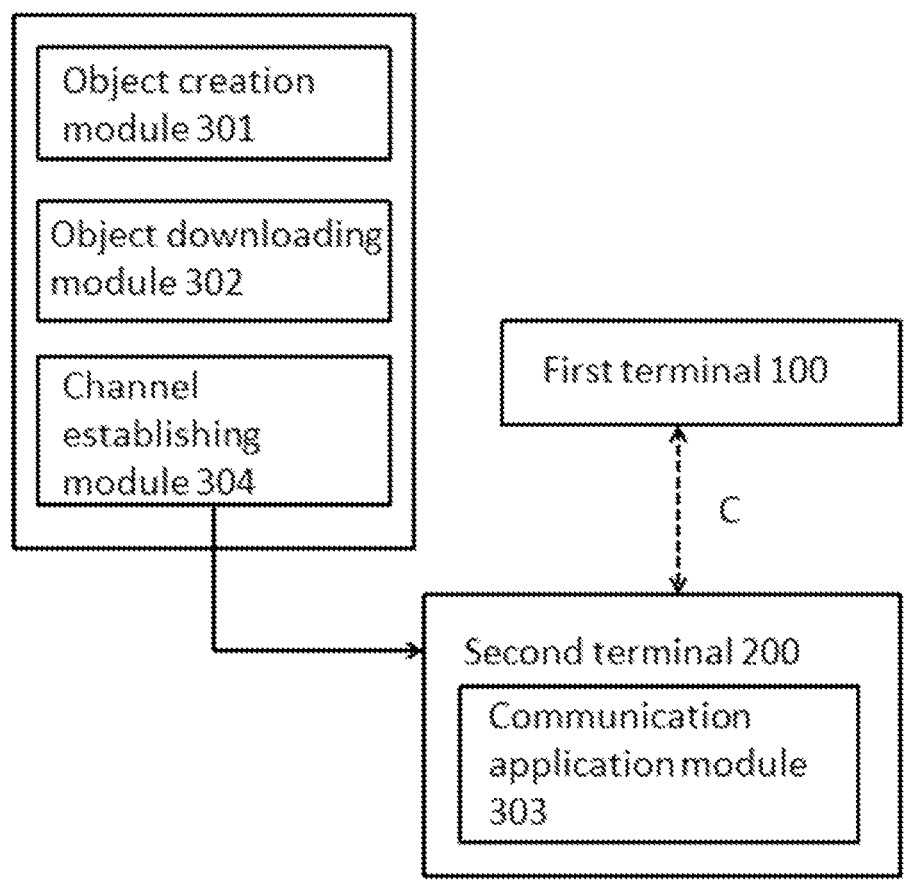
FIG. 1 is a block diagram of an exemplary embodiment of a simple communication system according to the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIG. 1 which shows a block diagram of an exemplary embodiment of a simple communication system according to the present disclosure. As shown in FIG. 1, the simple communication system comprises an object creation module 301, an object downloading module 302, and a channel establishing module 304. The object creation module 301 generates a communication application module 303 according to a notice path for the second user 200 provided by the first user 100. In implementation, the notice path comprises an email address, a social network account, or an instant communication account of the second user 200.

In addition, the first user 100 can set a communication setting condition for the communication application module 303. The communication setting condition comprises a time limitation of communication, a type of the communication approach, telephone number of the first user, free telecommunication authority, and the invalidation time of the communication application module.

For example, the communication setting condition can be set that the second user 200 only can communicate the first user 100 at period of 10 am to 5 pm, or the communication application module 303 will be invalidated five day later.

According to the notice path, the object downloading module 302 informs the second user 200 to download and install the communication application module 303 in a communication terminal of the second user 200. In implementation, the object downloading module 302 can email the communication application module 303 to the second user 200, or email the download address for the communication application module 303 to the second user 200, and the second user 200 then connects the download address to download and install the communication application module 303. After the communication application module 303 is installed in the communication terminal of the second user 200, a click-to-call icon is generated and displayed on a screen of on the communication terminal. In implementation, the communication terminal may be a smart phone or a computer, and the communication application module 303 may be an APP program, and the click-to-call icon can be a button displayed on a touch control screen. In addition, the first user 100 can set the image to be shown on the click-to-call icon.

When the click-to-call icon is trigged by the second user 200, it means that the second user 200 wants to talk with the first user 100, and the channel establishing module 304 establishes the communication channel C according to a request from the second user 200. The channel establishing module 304 is not allowed to accept the request of the first user 100 to establish the communication channel C.

In implementation, the object creation module 301, the object downloading module 302 and the channel establishing module 304 can be installed on a cloud communication server, and the first user 100 must register and login the cloud communication server first to use the service of establishing the communication application module 303. In addition, the object creation module 301, the object downloading module 302 and the channel establishing module 304 also can be implemented by individual hardware, or be implemented by software executed by a processor of the cloud communication server, but the present disclosure is not limited thereto.

In detail, to establish the communication channel C, the channel establishing module 304 can generate a network communication channel according to instant communication software or a web communication module installed by the second user 200. Therefore, the communication method of the present disclosure may solve the problem that both users in the communication must login on the network communication platform first for communication in the prior art. Moreover, the second user downloads and installs the communication application to connect the first user 100, so that the personal information security of the second user 200 can be protected and the second user 200 still can keep contact with many persons respectively under the protection.

Figure 2:
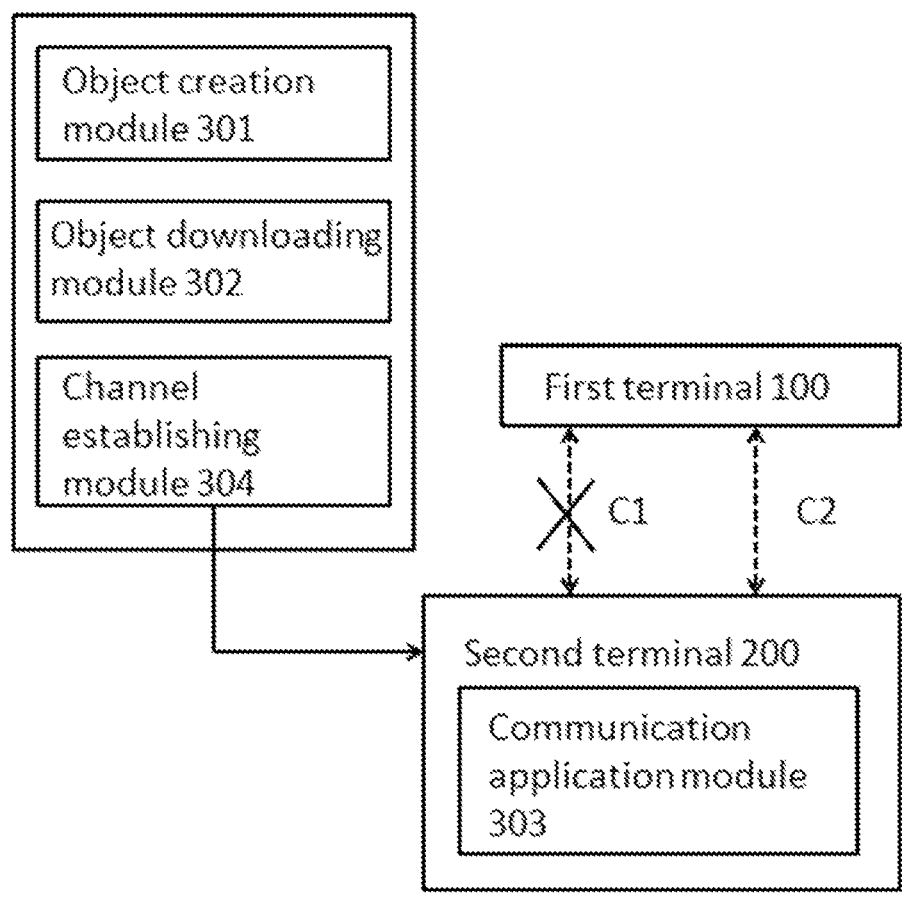
FIG. 2 is a block diagram of other exemplary embodiment of the simple communication system according to the present disclosure.

Please refer to FIG. 2 which shows a block diagram of another exemplary embodiment of the simple communication system according to the present disclosure. As shown in FIG. 2, when the channel establishing module 304 can not establish the network communication channel C1, the channel establishing module 304 establishes a telecommunication channel C2 automatically according to the communication setting condition for the communication application module 303 set by the first user 100, such as a time limitation of communication, a type of the communication approach, telephone number of the first communication terminal, free telecommunication authority, the invalidation time of the communication application module and the image to be shown on the click-to-call icon, so as to ensure the communication between the first user 100 and the second user 200 not to be interfered by the network environment. In addition, an encrypt scheme can be applied in the communication setting content for ensuring the personal information security. How to generate the network communication channel C1 is the same as the above-described content, so the detail description is omitted.

In detail, the communication setting condition in the communication application module 303 set by the first user 100 can be widely applied in any communication system. The different communication setting conditions can be respectively adapted for different group of customers, for example, the communication setting condition for VIP customers includes free telecommunication authority and no time limitation. Therefore, the first user can customize the communication with different second users under the protection of personal information security.

By the simple communication system of the present disclosure, the first user 100 can keep in touch with the second users 200 without leaving his or her important personal information such as telephone number or email account. The second users 200 can respectively communicate with the first user 100 via the communication application modules 303 installed in the terminals of the second users 200 according to the communication setting conditions set by the first user 100.

Figure 3:
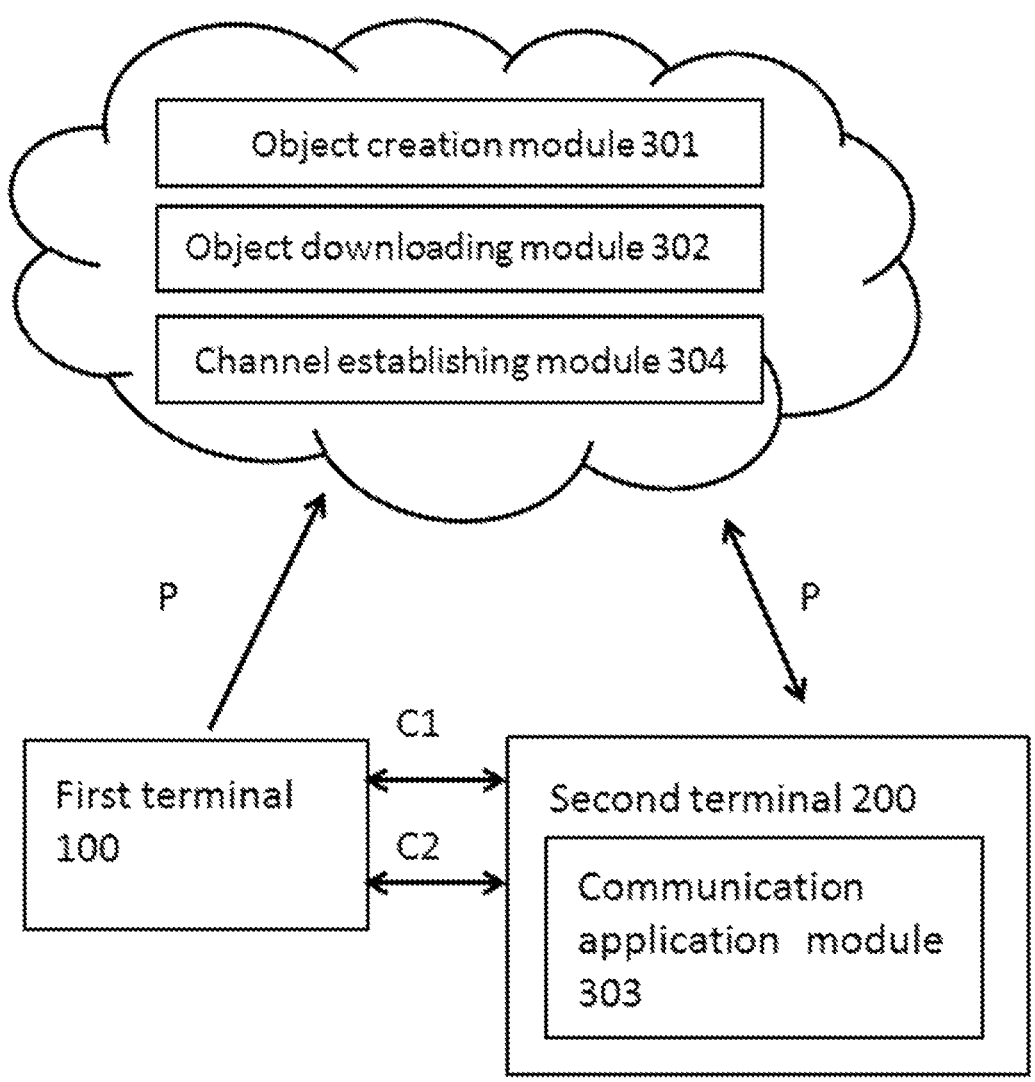
FIG. 3 is a schematic view of an exemplary embodiment of a simple communication method according to the present disclosure.

Please refer to FIG. 3 which shows a schematic view of another exemplary embodiment of a simple communication method according to the present disclosure. As shown in FIG. 3, a cloud server comprising a channel establishing module 304, an object creation module 301, and an object downloading module 302, is provided. When the first user 100 connects the cloud server by a network transmission protocol P and provides a notice path for a second user 200, the object creation module 301 is used to generate a communication application module 303 according to the notice path. The object downloading module 302 informs the second user 200 by the notice path to download and install the communication application module 303, and a click-to-call icon is generated on a communication terminal of the second user 200 after the communication application module 303 is installed. When the click-to-call icon on the communication terminal trigged by the second user 200, the channel establishing module 304 establishes the communication channel C according to a request from the second user 200. The channel establishing module 304 is not allowed to accept the request from the first user 100 to establish the communication channel C.

In detail, the network transmission protocol P comprises an Ethernet or a Wi-Fi wireless network. The communication channel C comprises a network communication channel C1 or a telecommunication channel C2. When the channel establishing module 304 cannot establish the network communication channel C1, the telecommunication channel C2 can be established automatically according to the communication setting condition for the communication application module 303 by the first user 100, to ensure the connection between the first user 100 and the second user 200 not to be interfered by the network.

Figure 4:
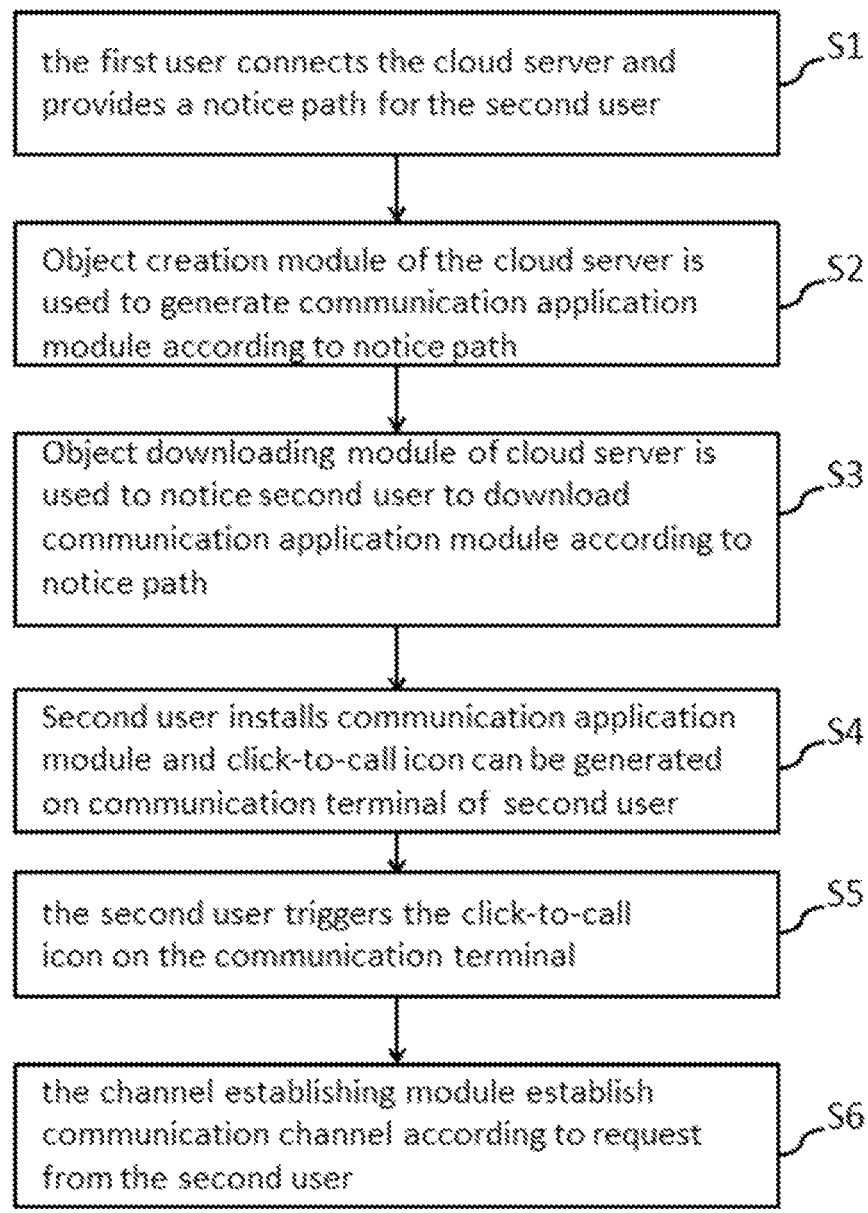
FIG. 4 is a flow diagram of the exemplary embodiment of the simple communication method according to the present disclosure.

Please refer to FIG. 4 which shows a flow diagram of another exemplary embodiment of step a simple communication method according to the present disclosure. As shown in FIG. 4, in step S1, the first user connects the cloud server and provides a notice path for the second user. In step S2, the object creation module of the cloud server is used to generate a communication application module according to a notice path. In step S3, the object downloading module of the cloud server is used to inform the second user to download communication application module according to the notice path. In step S4, The second user installs the communication application module in a communication terminal and a click-to-call icon can be generated on the communication terminal. In step S5, the second user triggers the click-to-call icon displayed on the communication terminal. In step S6, the channel establishing module establishes a communication channel according to a request from the second user.

In summary, a simple communication system and a method thereof of the present disclosure can provide communication between users and protection for personal privacy. Such innovative communication mode has never seen before. In addition, while establishing the communication channel, the channel establishing module selects the instant communication software first for channel connection, so as to reduce cost of the communication between the first user and second user. When the channel establishing module cannot establish the communication channel by network, the channel establishing module can establish telecommunication channel automatically, to ensure smooth connection between the first user and the second user. The communication established by the shortcut button can ensure the personal privacy of the first user not to be betrayed. Therefore, the simple communication system and a method thereof have advantages of personal information security, convenience and communication at any time.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A simple non-transitory communication system, adapted for communication between a second user and a first user, the simple non-transitory communication system comprising:
    a hardware implemented object creation module, configured for generating communication application information according to a notice path for the second user provided by the first user;
    a hardware implemented object downloading module, configured for informing the second user to download and install the communication application information, and generating a click-to-call icon on a communication terminal of the second user; and
    a hardware implemented channel establishing module, configured for establishing a communication channel between the second user and the first user;
    when the click-to-call icon on the communication terminal is triggered by the second user, the hardware implemented channel establishing module establishes the communication channel according to a request of the second user;

wherein the hardware implemented channel establishing module is not allowed to accept the request of the first user to establish the communication channel;

wherein the communication channel comprises a network communication channel or a telecommunication channel, and the hardware implemented channel establishing module establishes the network communication channel according to instant communication information or web communication information, and when the network communication channel cannot be established, the hardware implemented channel establishing module establishes the telecommunication channel to connect the second user and the first user.

2. The simple non-transitory communication system according to claim 1, wherein the hardware implemented object downloading module further installs the instant communication information in the communication terminal after installing the communication application information in the communication terminal of the second user.

3. The simple non-transitory communication system according to claim 1, wherein content of the communication application information is an encrypted information, and the second user cannot obtain any information related to the first user from the communication application information.

4. The simple non-transitory communication system according to claim 1, wherein the first user can set a communication setting condition for the second user in the communication application information, the communication setting condition comprises a time limitation of the communication, a type of the communication approach, telephone number of the first user, free telecommunication authority, the invalidation time of the communication application information, or the image to be shown on the click-to-call icon.

5. A simple non-transitory communication method, for establishing a communication channel between a first user and a second user, the simple non-transitory communication method comprising:

providing a cloud server which comprises a hardware implemented channel establishing module, a hardware implemented object creation module and a hardware implemented object downloading module;

using the hardware implemented object creation module to generate communication application information according to a notice path when the first user connects the cloud server and provides a notice path for the second user;

using the hardware implemented object downloading module to inform the second user to download and install the communication application information, and generating a click-to-call icon on a communication terminal of the second user; and when the click-to-call icon on the communication terminal is triggered by the second user, the hardware implemented channel establishing module establishes the communication channel according to a request of the second user;

wherein the hardware implemented channel establishing module is not allowed to accept the request of the first user to establish the communication channel;

wherein the communication channel comprises a network communication channel or a telecommunication channel, and the hardware implemented channel establishing module establishes the network communication channel according to instant communication information or web communication information, and when the network communication channel cannot be established, the hardware implemented channel establishing module establishes the telecommunication channel to connect the second user and the first user.

6. The simple non-transitory communication method according to claim 5, further comprising a step of installing the instant communication information in the communication terminal after installing the communication application information in the communication terminal of the second user.

7. The simple non-transitory communication method according to claim 5, wherein content of the communication application information is an encrypted information and any information related to the first user cannot be obtained from the communication application information.

8. The simple non-transitory communication method according to claim 5, further comprising a step of providing the first user to set a communication setting condition for the second user in the communication application information, wherein the communication setting condition comprises a time limitation of the communication, a type of the communication approach, telephone number of the first user, free telecommunication authority, the invalidation time of the communication application information, or the image to be shown on the click-to-call icon.

* * * * *